United States Patent
Larsson et al.

(10) Patent No.: US 10,412,749 B2
(45) Date of Patent: Sep. 10, 2019

(54) SCHEDULING IN LICENSE ASSISTED ACCESS

(71) Applicant: Telefonaktiebolaget LM Ericsson (publ), Stockholm (SE)

(72) Inventors: Daniel Larsson, Stockholm (SE); Jung-Fu Cheng, Fremont, CA (US); Sorour Falahati, Stockholm (SE); Havish Koorapaty, Saratoga, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 117 days.

(21) Appl. No.: 15/159,305

(22) Filed: May 19, 2016

(65) Prior Publication Data
US 2016/0345344 A1  Nov. 24, 2016

Related U.S. Application Data

(60) Provisional application No. 62/165,025, filed on May 21, 2015.

(51) Int. Cl.
*H04W 4/00* (2018.01)
*H04W 72/12* (2009.01)
(Continued)

(52) U.S. Cl.
CPC ... *H04W 72/1205* (2013.01); *H04W 72/1263* (2013.01); *H04W 72/1289* (2013.01);
(Continued)

(58) Field of Classification Search
None
See application file for complete search history.

(56) References Cited

U.S. PATENT DOCUMENTS 9,392,606 B2 * 7/2016 Zhu ............................ H04L 5/14
9,674,837 B1 * 6/2017 Sevindik .............. H04L 5/0035
(Continued)

FOREIGN PATENT DOCUMENTS

EP   3100555 B   1/2015
JP   2013251860 A   12/2013
(Continued)

OTHER PUBLICATIONS

3GPP TSG RAN WG1 #80bis; Belgrade, Serbia; Source: Qualcomm Incorporated; Title: Adaptive Frame Structure and DL-UL Configuration for LAA (R1-151404)—Apr. 20-24, 2015.
(Continued)

*Primary Examiner* — Bob A Phunkulh
(74) *Attorney, Agent, or Firm* — Baker Botts, LLP

(57) ABSTRACT

According to some embodiments, a method in a network node comprises determining a first uplink/downlink scheduling pattern for a first plurality of consecutive subframes; transmitting the first uplink/downlink scheduling pattern to a wireless device; transmitting at least one subframe to the wireless device according to the first uplink/downlink scheduling pattern; determining a second uplink/downlink scheduling pattern for a second plurality of consecutive subframes, wherein the first plurality of consecutive subframes and the second plurality of consecutive subframes share at least one subframe; and transmitting the second uplink/downlink scheduling pattern to the wireless device.

20 Claims, 9 Drawing Sheets

(51) Int. Cl.
| | |
|---|---|
| H04W 74/08 | (2009.01) |
| H04L 5/00 | (2006.01) |
| H04W 84/04 | (2009.01) |
| H04W 84/12 | (2009.01) |

(52) U.S. Cl.
CPC ........... *H04L 5/0007* (2013.01); *H04W 74/08* (2013.01); *H04W 84/042* (2013.01); *H04W 84/12* (2013.01)

(56) References Cited

U.S. PATENT DOCUMENTS

| | | | | |
|---|---|---|---|---|
| 9,794,859 | B2* | 10/2017 | Wang | H04W 4/70 |
| 10,148,409 | B2* | 12/2018 | Kim | H04B 7/26 |
| 2009/0249153 | A1* | 10/2009 | Zhang | H04L 1/1887 |
| | | | | 714/748 |
| 2010/0054161 | A1* | 3/2010 | Montojo | H04W 72/042 |
| | | | | 370/280 |
| 2011/0128893 | A1* | 6/2011 | Park | H04B 7/155 |
| | | | | 370/279 |
| 2013/0083707 | A1* | 4/2013 | Wang | H04W 72/1289 |
| | | | | 370/280 |
| 2013/0142175 | A1* | 6/2013 | Manssour | H04W 72/1252 |
| | | | | 370/336 |
| 2013/0242824 | A1* | 9/2013 | Lee | H04L 1/1819 |
| | | | | 370/281 |
| 2013/0265948 | A1* | 10/2013 | Lee | H04L 1/1861 |
| | | | | 370/329 |
| 2013/0272230 | A1 | 10/2013 | Dinan | |
| 2013/0308567 | A1* | 11/2013 | Chen | H04L 5/005 |
| | | | | 370/329 |
| 2013/0322304 | A1* | 12/2013 | Yang | H04W 72/042 |
| | | | | 370/280 |
| 2014/0003326 | A1* | 1/2014 | Nishio | H04W 16/26 |
| | | | | 370/315 |
| 2014/0029486 | A1* | 1/2014 | Li | H04L 5/1469 |
| | | | | 370/280 |
| 2014/0092862 | A1* | 4/2014 | Noh | H04B 7/0413 |
| | | | | 370/330 |
| 2014/0112263 | A1* | 4/2014 | Lee | H04W 72/1289 |
| | | | | 370/329 |
| 2014/0153453 | A1* | 6/2014 | Park | H04B 7/2656 |
| | | | | 370/280 |
| 2014/0185539 | A1* | 7/2014 | Seo | H04B 7/2656 |
| | | | | 370/329 |
| 2015/0030090 | A1* | 1/2015 | You | H04L 5/14 |
| | | | | 375/260 |
| 2015/0055522 | A1* | 2/2015 | Fu | H04L 5/0007 |
| | | | | 370/280 |
| 2015/0085671 | A1* | 3/2015 | Wu | H04W 24/02 |
| | | | | 370/241 |
| 2015/0245376 | A1* | 8/2015 | Bashar | H04L 1/18 |
| | | | | 370/277 |
| 2015/0282124 | A1* | 10/2015 | Miao | H04W 72/042 |
| | | | | 455/450 |
| 2015/0282148 | A1* | 10/2015 | Le | H04W 72/0406 |
| | | | | 370/329 |
| 2015/0296391 | A1* | 10/2015 | Kotkar | H04W 52/0219 |
| | | | | 370/254 |
| 2015/0305058 | A1* | 10/2015 | Hammarwall | H04J 1/00 |
| | | | | 370/280 |
| 2015/0358997 | A1* | 12/2015 | Yang | H04W 72/12 |
| | | | | 370/329 |
| 2016/0007347 | A1* | 1/2016 | Nagata | H04W 16/30 |
| | | | | 370/280 |
| 2016/0112913 | A1* | 4/2016 | Malkamaki | H04W 36/0055 |
| | | | | 455/444 |
| 2016/0143042 | A1 | 5/2016 | Nagata et al. | |
| 2016/0211955 | A1* | 7/2016 | Wu | H04W 24/02 |
| 2016/0345315 | A1* | 11/2016 | Noh | H04W 72/0406 |
| 2017/0273077 | A1* | 9/2017 | Kim | H04W 76/27 |

FOREIGN PATENT DOCUMENTS

| | | |
|---|---|---|
| JP | 2015-2403 A | 1/2015 |
| RU | 2009133308 A | 3/2011 |
| WO | 2014161174 A1 | 10/2014 |

OTHER PUBLICATIONS

PCT Notification of Transmittal of the International Search Report and the Written Opinion of the International Searching Authority, or the Declaration for International application No. PCT/IB2016/052981—Aug. 10, 2016.

3GPP TSG RAN WG1 LAA Ad-hoc; Paris France; Source: Qualcomm Incorporated; Title: Adaptive Frame Structure and DL-UL configuration for LAA (R1-150997)—Mar. 24-26, 2015.

Russian Federation, Official Action, Substantive Examination: Applicant Telefonaktiebolaget LM Ericsson (Publ), SE, Application No. 2017144510/08(076362), Our Reference: P47106RU1; U.S. Translation, and Search Report, Application filed May 20, 2016; Dated: Jul. 23, 2018.

Russian Federation, Decision on Grant a Patent for Invention; Applicant Telefonaktiebolaget LM Ericsson (Publ), SE, Application No. 2017144510/08/(76362), plus Enclosure 1—Abstract, Our Reference P47106RU1; Application filed May 20, 2016; Document Dated: Dec. 6, 2018.

Russian Federation, Decision on Grant, Applicant Telefonaktiebolaget LM Ericsson (Publ), SE, Application No. 2017144510/08/(76362) and Enclosure No. 1, Our Reference P47106RU1; English Translation; Application filed May 20, 2016;Translation Dated: Dec. 26, 2018.

Sonoda & Kobayashi IP Law, "Report Notice for Reasons of Rejection," to Ericsson (English translation); Japanese Patent Application No. 2017-560754; dated Dec. 25, 2018; 3 pages.

Japanese Patent Office, "Notice of Reasons of Rejection," Japanese Patent Application No. 2017-560754 in Japanese (English translation is listed above of the Report Notice for Reasons of Rejection); Dec. 11, 2018; 8 pages.

Nokia Siemens Networks, Nokia, "On signalling mechanisms to support dynamic TDD UL-DL reconfiguration," 3GPP TSG-RAN WG1 Meeting NR#73, R1-132297, Fukuoka, Japan, May 20-24, 2013, 4 pages.

Qualcomm, "Way Forward on Adaptive DL-UL Configuration for LAA," 3GPP TSG RAN WG1 LAA Ad-hoc, R1-151175, Paris, France, Mar. 24-26, 2015, 3 pages.

European Patent Office, Communication pursuant to Article 94(3) EPC; Application No. 16 725 602.3-1215, ref. P133137EPPC, Dated Mar. 3, 2019; 5 pages.

Korean Patent Office, First Office Action, Notice of Preliminary Rejection; Applicant Telefonaktiebolaget LM Ericsson (Publ), Reference No. 10-2017-7026486; 5 pages; dated Apr. 19, 2019.

Japanese Patent Office; Final Action, Notice for Reasons for Rejection (includes English translation); Applicant Telefonaktiebolaget LM Ericsson (Publ), Reference No. 2017-560754; 10 pages; dated Apr. 16, 2019.

Korean Patent Office, First Office Action, Notice of Preliminary Rejection; Applicant Telefonaktiebolaget LM Ericsson (Publ), Reference No. 10-2017-7036486; 5 pages; dated Apr. 19, 2019.

* cited by examiner

SCHEDULING IN LICENSE ASSISTED ACCESS

RELATED APPLICATION

This application claims benefit under 35 U.S.C. § 119(e) to U.S. Provisional Application Ser. No. 62/165,025, entitled "METHODS OF LAA SCHEDULING BROADCAST," filed May 21, 2015, the entire content of which is incorporated herein by reference.

TECHNICAL FIELD

Particular embodiments relate generally to wireless communications networks, and more particularly to subframe scheduling for license assisted access (LAA).

BACKGROUND

The Third Generation Partnership Project (3GPP) initiative referred to as License Assisted Access (LAA) enables long term evolution (LTE) equipment to operate in the unlicensed 5 GHz radio spectrum. The unlicensed 5 GHz spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

Regulatory requirements, however, may not permit transmissions in the unlicensed spectrum without prior channel sensing. This is because the unlicensed spectrum is shared with radios of similar or dissimilar wireless technologies. Wireless devices may perform channel sensing using a listen-before-talk (LBT) method. Today, the unlicensed 5 GHz spectrum is mainly used by equipment implementing the IEEE 802.11 Wireless Local Area Network (WLAN) standard. This standard is known under its marketing brand "Wi-Fi."

In Europe the LBT procedure is under the scope of EN 301.893 regulation. For LAA to operate in the 5 GHz spectrum, the LAA LBT procedure conforms to requirements and minimum behaviors set forth in EN 301.893. Additional system designs and steps, however, are needed to ensure coexistence of Wi-Fi and LAA with EN 301.893 LBT procedures. For example, U.S. Pat. No. 8,774,209 titled "Apparatus and method for spectrum sharing using listen-before-talk with quiet periods" describes frame-based orthogonal frequency division multiplexing (OFDM) systems that use LBT to determine whether a channel is free prior to transmission. A maximum transmission duration timer is used to limit the duration of a transmission burst, and is followed by a quiet period.

LTE uses OFDM in the downlink and DFT-spread OFDM (also referred to as single-carrier FDMA) in the uplink. The basic LTE downlink physical resource comprises a time-frequency grid as illustrated in FIG. 1.

FIG. 1 illustrates an example OFDM symbol. The horizontal axis represents time and the other axis represents frequency. Each resource element corresponds to one OFDM subcarrier during one OFDM symbol interval. An uplink subframe has the same subcarrier spacing as the downlink and the same number of SC-FDMA symbols in the time domain as OFDM symbols in the downlink. In the time domain, LTE downlink transmissions are organized into radio frames.

FIG. 2 illustrates an example radio frame. Each radio frame is 10 ms and consists of ten equally-sized subframes of length Tsubframe=1 ms. For normal cyclic prefix, one subframe consists of 14 OFDM symbols. The duration of each symbol is approximately 71.4 μs.

Resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled. In each subframe a base station transmits control information about which terminals data is transmitted to and upon which resource blocks the data is transmitted in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information.

FIG. 3 illustrates an example downlink subframe. The subframe includes reference symbols and control signaling. In the illustrated example, the control region includes 3 OFDM symbols (i.e., CFI=3). The reference symbols include cell specific reference symbols (CRS) which may support multiple functions including fine time and frequency synchronization and channel estimation for certain transmission modes.

For LTE Rel-8 to Rel-10, a base station schedules downlink transmissions using a Physical Downlink Control Channel (PDCCH). From LTE Rel-11 and onwards, downlink transmissions may also be scheduled on an Enhanced Physical Downlink Control Channel (EPDCCH).

The PDCCH/EPDCCH carries downlink control information (DCI) such as scheduling decisions and power-control commands. For example, the DCI includes downlink scheduling assignments such as Physical Downlink Shared Channel (PDSCH) resource indication, transport format, hybrid-ARQ information, and control information related to spatial multiplexing (if applicable). A downlink scheduling assignment also includes a command for power control of the Physical Uplink Control Channel (PUCCH) used for transmission of hybrid-ARQ acknowledgements in response to downlink scheduling assignments. The DCI may also include uplink scheduling grants such as Physical Uplink Shared Channel (PUSCH) resource indication, transport format, and hybrid-ARQ-related information. An uplink scheduling grant also includes a command for power control of the PUSCH. The DCI may also include power control commands for a set of terminals as a complement to the commands included in the scheduling assignments/grants.

One PDCCH/EPDCCH carries one DCI message containing one of the groups of information listed above. Because a base station may schedule multiple terminals simultaneously, and each terminal may be scheduled on both downlink and uplink simultaneously, multiple scheduling messages may be transmitted within each subframe. Each scheduling message is transmitted on separate PDCCH/EPDCCH resources. Consequently, multiple simultaneous PDCCH/EPDCCH transmissions are typically within each subframe in each cell. Furthermore, support for different radio-channel conditions may use link adaptation. In link adaptation the code rate of the PDCCH/EPDCCH is selected by adapting the resource usage for the PDCCH/EPDCCH to match the radio-channel conditions.

In LTE, the eNB transmits the uplink transmission scheduling command to the user equipment (UE). The LTE standard specifies a fixed delay between the time the scheduling command is transmitted and the time the UE transmits the uplink signal. This delay provides the UE time to decode the PDCCH/EPDCCH and prepare the uplink signal for transmission. For a frequency division duplex (FDD) serving cell, the uplink grant delay is 4 ms. For a time division duplex (TDD) serving cell, the uplink grant delay can be greater than 4 ms.

The LTE Rel-10 standard supports bandwidths larger than 20 MHz. One requirement of LTE Rel-10 is backward compatibility with LTE Rel-8. This includes spectrum compatibility. One way to provide compatibility is for an LTE Rel-10 carrier wider than 20 MHz to appear as a number of LTE carriers to an LTE Rel-8 terminal. Each such carrier may be referred to as a Component Carrier (CC).

For early LTE Rel-10 deployments, the number of LTE Rel-10-capable terminals will likely be smaller than the number of LTE legacy terminals already in existence. Thus, efficient use of a wide carrier is needed for legacy terminals, i.e. providing carriers where legacy terminals may be scheduled in all parts of the wideband LTE Rel-10 carrier. One solution uses carrier aggregation. Using carrier aggregation, an LTE Rel-10 terminal may receive multiple component carriers. The components carriers may have the same structure as a Rel-8 carrier.

FIG. 4 illustrates an example of carrier aggregation. A system bandwidth of 100 MHz may be represented by 5 component carriers each with 20 MHz bandwidth. A UE capable of carrier aggregation may be assigned a primary cell (PCell), which is always activated, and one or more secondary cells (SCells) which may be activated or deactivated dynamically.

The number of aggregated component carriers as well as the bandwidth of the individual component carriers may be different for uplink and downlink. A symmetric configuration refers to a configuration where the number of component carriers in downlink is the same as in uplink. An asymmetric configuration refers to a configuration where the number of component carriers is different between downlink and uplink. The number of component carriers configured in a cell may be different from the number of component carriers seen by a terminal. For example, a terminal may support more downlink component carriers than uplink component carriers, even though the cell is configured with the same number of uplink and downlink component carriers.

Another feature of carrier aggregation is the ability to perform cross-carrier scheduling. Cross-carrier scheduling enables a (E)PDCCH on one component carrier to schedule data transmissions on another component carrier using a 3-bit Carrier Indicator Field (CIF) inserted at the beginning of the (E)PDCCH messages. For data transmissions on a given component carrier, a UE expects to receive scheduling messages on the (E)PDCCH of just one component carrier (i.e., either the same component carrier, or a different component carrier via cross-carrier scheduling). The mapping from (E)PDCCH to PDSCH may be configured semi-statically.

In LTE, the scheduling information for uplink and downlink transmissions on the PCell is transmitted on the PCell using (E)PDCCH. LTE refers to this scheduling mechanism as a self-scheduling method. For a SCell, LTE supports two scheduling mechanisms—self-scheduling or cross-scheduling. Using SCell self-scheduling (similar to PCell self-scheduling), the uplink and downlink scheduling information for the SCell is transmitted on the same SCell using (E)PDCCH. In SCell cross-scheduling, the network configures a SCell via higher layer signaling to use a cross-scheduling mechanism. In this approach, the uplink and downlink scheduling information for a SCell is transmitted on a second cell using (E)PDCCH. The second cell may be the PCell or another SCell. In LTE, the downlink and uplink scheduling mechanisms are configured together (i.e., the downlink and uplink transmissions of a cell are either both self-scheduling or both cross-scheduling).

Another wireless network technology that may share unlicensed spectrum with LTE is a wireless local area network (WLAN). Typical WLAN deployments use carrier sense multiple access with collision avoidance (CSMA/CA) for medium access. This means that the channel is sensed to perform a clear channel assessment (CCA), and a transmission is initiated only if the channel is determined to be idle. If the channel is determined to be busy, then the transmission is deferred until the channel is idle. When the range of several access points using the same frequency overlap, all transmissions related to one access point might be deferred when a transmission on the same frequency to or from another access point which is within range is detected. Effectively, if several access points are within range of each other, they will need to share the channel in time, and the throughput for the individual access points may be severely degraded.

FIG. 5 illustrates an example WLAN listen-before-talk mechanism. After a first Wi-Fi station transmits a data frame to a second Wi-Fi station, the second station transmits an ACK frame back to the first station with a delay of 16 µs. The ACK frame is transmitted by the second station without performing a LBT operation. To prevent another station interfering with the ACK frame transmission, a station defers for a duration of 34 µs (referred to as DIFS) after the channel is observed to be occupied before assessing again whether the channel is occupied.

Thus, a station that wishes to transmit first performs a clear channel assessment by sensing the medium for a fixed duration DIFS. If the medium is idle, then the station assumes that it may take ownership of the medium and begins a frame exchange sequence. If the medium is busy, the station waits for the medium to go idle, defers for DIFS, and waits for a further random backoff period. To further prevent a station from occupying the channel continuously and thereby preventing other stations from accessing the channel, after a successful transmission, a station performs a random backoff before transmitting again.

The PIFS is used to gain priority access to the medium, and is shorter than the DIFS duration. As one example, PIFS may be used by stations operating under point coordination function (PCF) to transmit Beacon Frames with priority. At the nominal beginning of each Contention-Free Period (CFP), the station senses the medium. When the medium is determined to be idle for one PIFS period (generally 25 µs), the station transmits a Beacon frame containing the CF Parameter Set element and a delivery traffic indication message element.

LTE has traditionally used dedicated frequency spectrum. An advantage of dedicated spectrum is that an LTE system does not need to coexist with other non-3GPP radio access technologies in the same spectrum, which can maximize spectrum efficiency. The spectrum allocated to LTE, however, is limited. It may not meet the ever increasing demand for larger throughput from applications/services. Therefore, 3GPP also specifies how LTE may use unlicensed spectrum in addition to licensed spectrum.

FIG. 6 illustrates a user equipment with license assisted access to unlicensed spectrum. In license assisted access, a UE is connected to a PCell in the licensed band and one or more SCells in the unlicensed band. A secondary cell in unlicensed spectrum may be referred to as a LAA secondary cell (LAA SCell). The LAA SCell may operate in downlink-only mode or operate with both uplink and downlink traffic. In some scenarios, LTE nodes may operate in standalone mode in license-exempt channels without assistance from a licensed cell.

Unlicensed spectrum can, by definition, be used simultaneously by multiple different technologies. Therefore, LAA must coexist and cooperate with other systems, such as IEEE 802.11 (Wi-Fi). To coexist fairly with a Wi-Fi system, transmission on the SCell conforms to LBT protocols to avoid collisions which may cause severe interference to on-going transmissions. This includes both performing LBT before commencing transmissions, and limiting the maximum duration of a single transmission burst. The maximum transmission burst duration is specified by country and region-specific regulations (e.g., 4 ms in Japan and 13 ms according to EN 301.893).

FIG. 7 illustrates an example of license assisted access to unlicensed spectrum using LTE carrier aggregation and listen-before-talk. FIG. 7 illustrates five example transmission bursts on an LAA SCell. Each transmission burst is constrained by a maximum allowed transmission duration of 4 ms. Before each LAA SCell transmission is a listening period. The example 8 ms burst is divided into two 4 ms bursts with a listening period before each.

Uplink transmissions are also supported on an LAA SCell. In one approach, a UE follows an LBT protocol to attempt channel access after receiving the uplink transmission scheduling command.

FIG. 8 illustrates an example of uplink license assisted access transmissions based on an uplink listen-before-talk protocol. The illustrated example divides an 8 ms occupancy time into 4 ms for downlink channel occupancy and 4 ms for uplink channel occupancy. After receiving a downlink transmission in subframes n−4 to n−1 (i.e., 4 ms), the UE performs a clear channel access for the uplink at subframe n. If the channel is clear, the UE transmits in uplink for subframes n to n+3 (i.e., 4 ms).

In another approach, the UE does not follow any LBT protocol to initiate channel access after receiving an uplink transmission scheduling command. LBT and CCA are performed by the eNB before the start of downlink transmissions. This may be referred to as a reverse direction grant protocol.

FIG. 9 illustrates an example of uplink license-assisted access transmissions based on a reverse direction grant protocol. The illustrated example divides an 8 ms occupancy time into 4 ms for downlink channel occupancy and 4 ms for uplink channel occupancy. After receiving a downlink transmission in subframes n−4 to n−1 (i.e., 4 ms), the UE transmits in uplink for subframes n to n+3 (i.e., 4 ms) without performing a CCA.

Various scheduling problems arise with LAA. For example, determining when an LTE node may access the unlicensed band is unpredictable. Also, coexisting Wi-Fi nodes operating on the same carrier in unlicensed bands operate asynchronously and thus they may start and stop transmissions at any time. Both of these factors will put LAA at a significant disadvantage if it were to use any of the currently defined LTE frame structures for downlink and uplink transmissions that require particular frames to have downlink transmissions and other frames to have uplink transmissions. If any of the fixed frame structure types 1 or 2 is used, then each subframe is pre-determined to be downlink, uplink or a special subframe that carries both downlink and uplink transmissions.

Even if a flexible subframe structure that allows some variations among these fixed subframe types is used, such as eIMTA, particular subframes still are pre-determined to be downlink, uplink, or a special subframe. If channel access is not gained in these particular subframes, the inflexibility of these structures can lead to additional delays, particularly at high loads. Such inflexibility could cause LAA to be an undesirable network configuration because of slow adaptability to interference and/or traffic demands.

Thus, LAA should have the flexibility for any subframe to carry at least downlink or uplink transmissions. Thus, conventional LTE frame structures are not applicable to LAA because LAA should have more flexibility than the conventional frame structures allow. Any subframe can be part of a downlink transmission burst or an uplink transmission burst. Generally, two classes of solutions exist for enabling a subframe to be part of a downlink transmission burst or an uplink transmission burst.

In one class of solutions, the UE determines the subframe format implicitly by assuming that every subframe is a downlink subframe unless explicitly signaled either via scheduling commands or other means. In each subframe that is assumed to be a downlink subframe, the UE determines whether the subframe contains any downlink transmissions by either decoding a successful control message (e.g., (E)PDCCH) or by detecting a reference signal (e.g., CRS). This class of solutions does not restrict the configuration of discontinuous reception (DRX) cycles for UEs. Scheduling can be fully dynamic on a subframe basis. A potential restriction may be the need for a special subframe or a shortened downlink subframe when a downlink transmission burst is followed by an uplink transmission burst from UEs in the same cell as the downlink transmission burst. A benefit is that the UE does not need to have any knowledge of the type of transmissions in future subframes even when a downlink subframe is successfully detected or an uplink transmission is made in an uplink subframe that has been successfully scheduled. These solutions may apply for half-duplex UEs as well, although uplink and downlink are on different frequencies.

In another class of solutions, the UE detects the start of a downlink transmission burst and the configuration of succeeding subframes in the downlink transmission burst and any following uplink transmission burst is explicitly indicated to the UE. This enables the UE to receive the subsequent subframes without performing any detection of signals on a subframe by subframe basis. The last subframe in the downlink transmission burst, when it is followed by an uplink transmission burst from UEs in the same cell as the downlink transmission burst, may still need a special subframe or a shortened downlink subframe as is the case with the first class of solutions. The UE still needs to perform blind decodes on (E)PDCCH to detect whether a (E)PDSCH is scheduled for the downlink subframes, similar to the first class of solutions.

DRX operation is important for conserving power consumption. Thus, using a conventional DRX framework for LAA is beneficial. Under this framework, using short DRX cycles, an eNB has the flexibility to configure UEs so that they can turn on in any particular subframe and search for downlink transmissions. This enables the eNB to spread the on period of the DRX cycles for the UEs connected to the cell evenly in time so that resources on the carrier can be used in a power efficient manner. Because a UE simply determines the status of each subframe separately, any UE can be configured to turn on from its DRX cycle at any time.

In the second class of solutions, the on periods of the short DRX cycles for many more UEs would need to be grouped together so that the UEs do not miss the signaling at the beginning of the downlink transmission burst that indicates the composition of the transmission burst and any following uplink transmission burst. Thus, a UE may have to spend more power keeping its receiver chain on just to be able to detect the start of the downlink transmission burst. Although the scheduler in the base station may know or determine in advance whether downlink or uplink traffic exists, and may determine whether to schedule a particular UE in downlink for certain time period, such information is not available to the UE. Thus, the UE keeps its receiver chain for a given carrier open although it will not receive any downlink traffic.

SUMMARY

The embodiments described herein include a network node that transmits information about subsequent downlink and uplink subframes to its served wireless devices to enable scheduling flexibility and to provide accurate updates of such information. For example, a network node may determine, based on its buffer status, that it will transmit a particular number of downlink subframes and signal to a wireless device that it will transmit in the downlink in the next n subframes. If additional downlink data arrives at the network node, the network node may determine it will transmit additional downlink subframes and signal to the wireless device that it will transmit in the downlink in the next x subframes. If a wireless device requests uplink transmission permission, the network node may determine how many downlink transmission subframes remain and determine that the next y subframes after the downlink subframes will be uplink subframes. The network node may signal this updated information to the wireless device. Particular embodiments may apply to operations on the licensed spectrum, unlicensed spectrum, or licensed shared spectrum.

According to some embodiments, a method in a network node comprises determining a first uplink/downlink scheduling pattern for a first plurality of consecutive subframes; transmitting the first uplink/downlink scheduling pattern to a wireless device; transmitting at least one subframe to the wireless device according to the first uplink/downlink scheduling pattern; determining a second uplink/downlink scheduling pattern for a second plurality of consecutive subframes, wherein the first plurality of consecutive subframes and the second plurality of consecutive subframes share at least one subframe; and transmitting the second uplink/downlink scheduling pattern to the wireless device.

In particular embodiments, the first uplink/downlink scheduling pattern comprises a first value representing a number of downlink subframes in the first plurality of consecutive subframes, and a second value representing a number of uplink subframes in the first plurality of consecutive subframes. In other embodiments, the first uplink/downlink scheduling pattern comprises at least one of a set of subframes in the first plurality of subframes that the wireless device does not monitor for downlink, or a set of subframes in the first plurality of subframes that the wireless device does monitor for downlink.

In particular embodiments, transmitting the first uplink/downlink scheduling pattern to the wireless device comprises transmitting the first uplink/downlink scheduling pattern in a long term evolution (LTE) physical downlink control channel (PDCCH), enhanced physical downlink control channel (EPDCCH), or physical control format indicator channel (PCFICH).

In particular embodiments, the network node serves a first cell and the first uplink/downlink scheduling pattern applies to a second cell different from the first cell.

According to some embodiments, a method in a wireless device comprises receiving, from a network node, a first uplink/downlink scheduling pattern for a first plurality of consecutive subframes; receiving at least one subframe according to the first uplink/downlink scheduling pattern; and receiving, from the network node, a second uplink/downlink scheduling pattern for a second plurality of consecutive subframes, wherein the first plurality of consecutive subframes and the second plurality of consecutive subframes share at least one subframe.

In particular embodiments, the first uplink/downlink scheduling pattern comprises a first value representing a number of downlink subframes in the first plurality of consecutive subframes, and a second value representing a number of uplink subframes in the first plurality of consecutive subframes. In other embodiments, the first uplink/downlink scheduling pattern comprises at least one of a set of subframes in the first plurality of subframes that the wireless device does not monitor for downlink, and a set of subframes in the first plurality of subframes that the wireless device does monitor for downlink.

In particular embodiments, receiving the first uplink/downlink scheduling pattern from the network node comprises receiving the first uplink/downlink scheduling pattern in a LTE PDCCH, EPDCCH, or PCFICH.

In particular embodiments, the network node serves a first cell and the first uplink/downlink scheduling pattern applies to a second cell different from the first cell.

According to some embodiments, a network node comprises a processor and a memory. The processor is operable to determine a first uplink/downlink scheduling pattern for a first plurality of consecutive subframes; transmit the first uplink/downlink scheduling pattern to a wireless device; transmit at least one subframe to the wireless device according to the first uplink/downlink scheduling pattern; determine a second uplink/downlink scheduling pattern for a second plurality of consecutive subframes, wherein the first plurality of consecutive subframes and the second plurality of consecutive subframes share at least one subframe; and transmit the second uplink/downlink scheduling pattern to the wireless device.

According to some embodiments, a wireless device comprises a processor and a memory. The processor is operable to receive, from a network node, a first uplink/downlink scheduling pattern for a first plurality of consecutive subframes; receive at least one subframe according to the first uplink/downlink scheduling pattern; and receive, from the network node, a second uplink/downlink scheduling pattern for a second plurality of consecutive subframes, wherein the first plurality of consecutive subframes and the second plurality of consecutive subframes share at least one subframe.

According to some embodiments, a network node comprises a determining module and a transmitting module. The determining module is operable to determine a first uplink/ downlink scheduling pattern for a first plurality of consecutive subframes. The transmitting module is operable to transmit the first uplink/downlink scheduling pattern to a wireless device, and transmit at least one subframe to the wireless device according to the first uplink/downlink scheduling pattern. The determining module is further operable to determine a second uplink/downlink scheduling pattern for a second plurality of consecutive subframes, wherein the first plurality of consecutive subframes and the second plurality of consecutive subframes share at least one subframe. The transmitting module is further operable to transmit the second uplink/downlink scheduling pattern to the wireless device.

According to some embodiments, a wireless device comprises a pattern receiving module and a subframe receiving module. The pattern receiving module is operable to receive, from a network node, a first uplink/downlink scheduling pattern for a first plurality of consecutive subframes. The subframe receiving module is operable to receive at least one subframe according to the first uplink/downlink scheduling pattern. The pattern receiving module is further operable to receive, from the network node, a second uplink/downlink scheduling pattern for a second plurality of consecutive subframes, wherein the first plurality of consecutive subframes and the second plurality of consecutive subframes share at least one subframe.

Also disclosed is a computer program product. The computer program product comprises instructions stored on non-transient computer-readable media which, when executed by a processor, perform the acts determining a first uplink/downlink scheduling pattern for a first plurality of consecutive subframes; transmitting the first uplink/downlink scheduling pattern to a wireless device; transmitting at least one subframe to the wireless device according to the first uplink/downlink scheduling pattern; determining a second uplink/downlink scheduling pattern for a second plurality of consecutive subframes, wherein the first plurality of consecutive subframes and the second plurality of consecutive subframes share at least one subframe; and transmitting the second uplink/downlink scheduling pattern to the wireless device.

Another computer program product comprises instructions stored on non-transient computer-readable media which, when executed by a processor, perform the acts of receiving, from a network node, a first uplink/downlink scheduling pattern for a first plurality of consecutive subframes; receiving at least one subframe according to the first uplink/downlink scheduling pattern; and receiving, from the network node, a second uplink/downlink scheduling pattern for a second plurality of consecutive subframes, wherein the first plurality of consecutive subframes and the second plurality of consecutive subframes share at least one subframe.

Particular embodiments may exhibit some of the following technical advantages. Particular embodiments provide scheduling flexibility, which improves network efficiency (e.g., efficient bandwidth usage) and provides adaptability to interference and/or traffic demands. Problems associated with fixing a scheduling pattern at the beginning of a long transmission burst may be avoided. Particular embodiments conserve power and battery life by not requiring all wireless devices to wake up from discontinuous reception mode and search for the specific point where scheduling information is received. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Because access to unlicensed bands is unpredictable (e.g., based on listen-before talk (LBT) protocols) and Wi-Fi nodes operating on the unlicensed bands operate asynchronously, license assisted access (LAA) may not operate efficiently using conventional fixed format LTE frame structures for downlink and uplink transmissions. When using a fixed format, if channel access is not gained in the predetermined subframes, then transmission delays may result, particularly at high loads.

An object of the present disclosure is to obviate at least the disadvantages above and provide LAA the flexibility for any subframe to include downlink or uplink transmissions. The embodiments described herein include a network node that transmits information about subsequent downlink and uplink subframes to its served wireless devices to enable scheduling flexibility and to provide accurate updates of such information. Embodiments also include a wireless device operable to receive flexible uplink and downlink scheduling information and to receive or transmit subframes according to the flexible uplink/downlink pattern.

Thus, particular embodiments provide scheduling flexibility, which improves network efficiency and provides adaptability to interference and/or traffic demands. Particular embodiments conserve power and battery life by not requiring all wireless devices to wake up from discontinuous reception mode and search for the specific point where scheduling information is received.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 10-14B of the drawings, like numerals being used for like and corresponding parts of the various drawings. LTE is used throughout this disclosure as an example cellular system, but the ideas presented herein may apply to other wireless communication systems as well.

Figure 10:
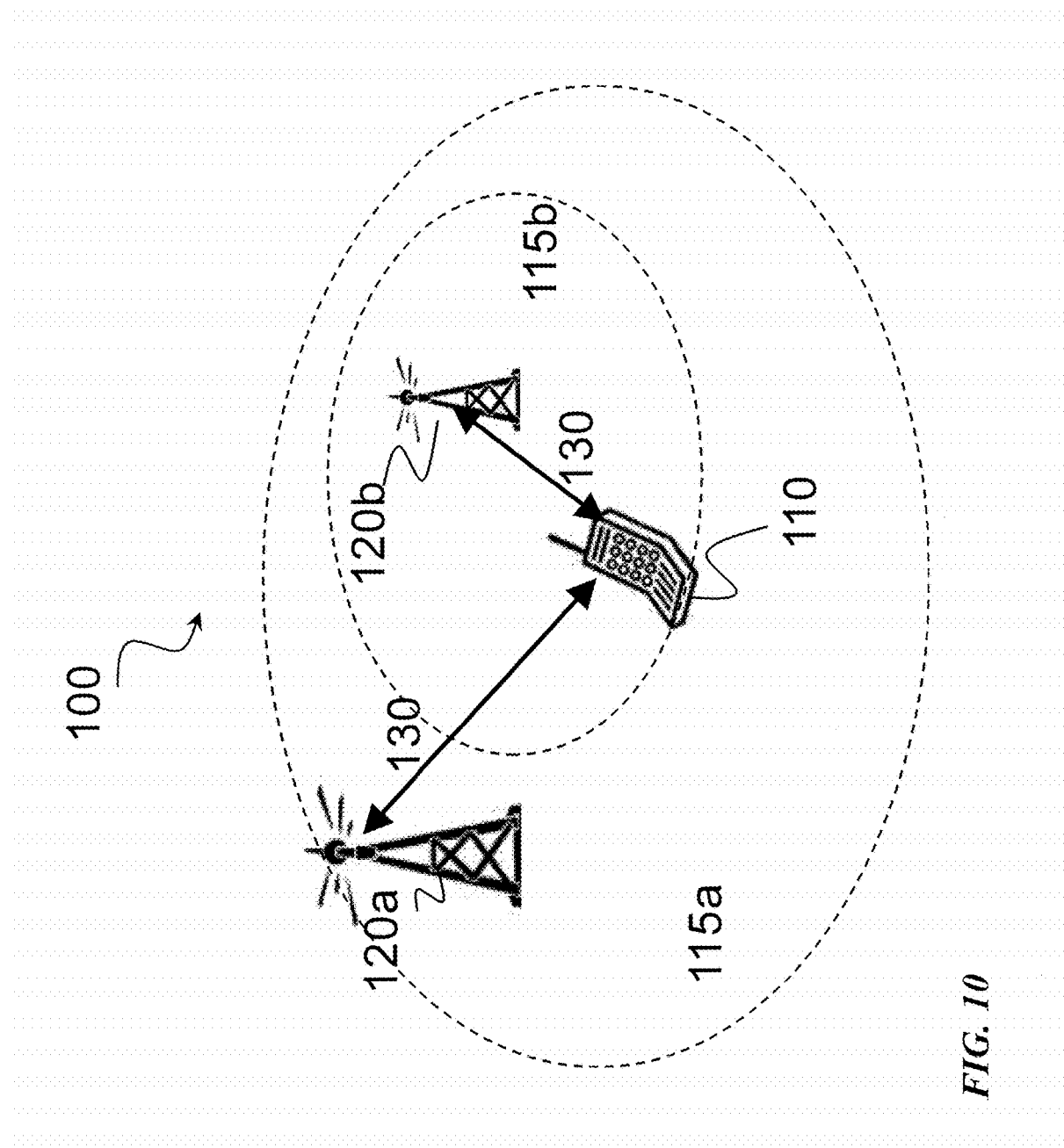
FIG. 10 is a block diagram illustrating an example wireless network, according to a particular embodiment.

FIG. 10 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Radio network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Wireless signals 130 may include both downlink transmissions (from radio network node 120 to wireless devices 110) and uplink transmissions (from wireless devices 110 to radio network node 120).

Figure 1:
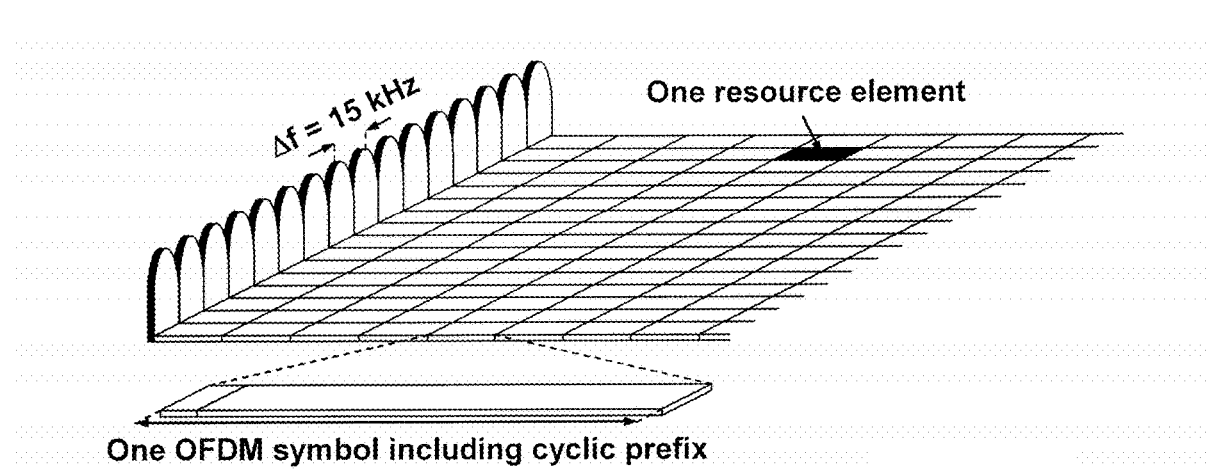
FIG. 1 illustrates an example Orthogonal Frequency-Division Multiplexed (OFDM) symbol.
Figure 2:
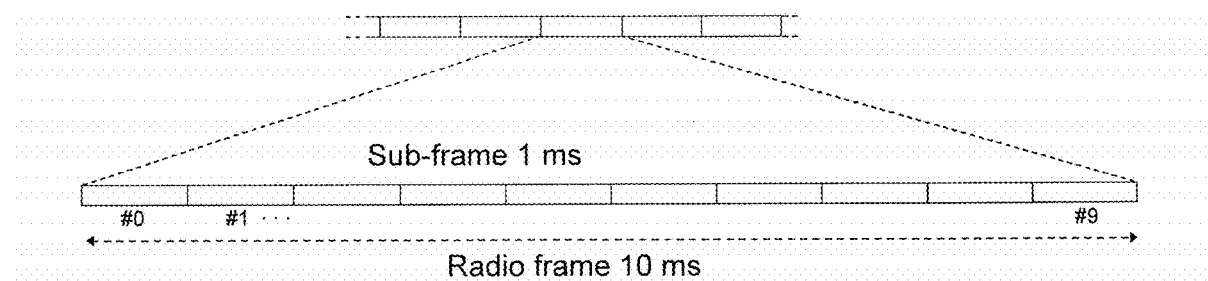
FIG. 2 illustrates an example radio frame.
Figure 3:
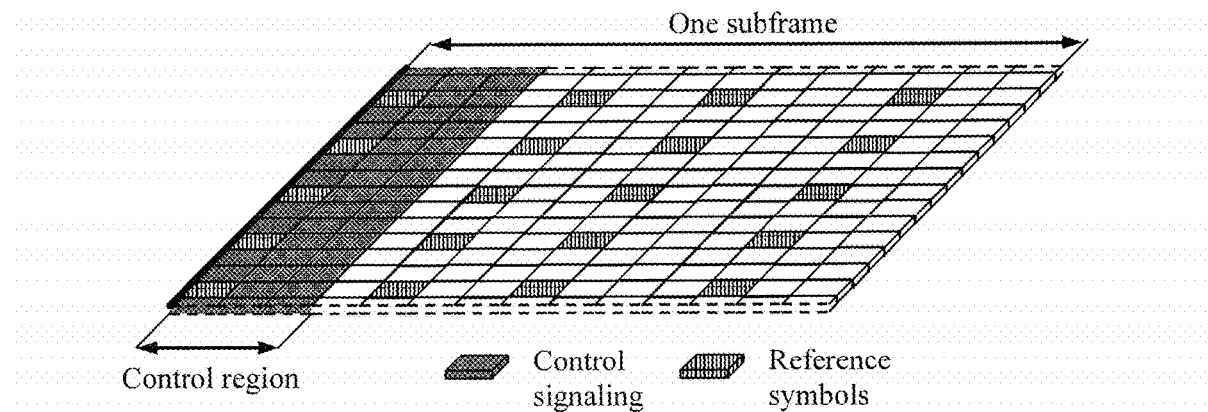
FIG. 3 illustrates an example downlink subframe.
Figures 4, 5:
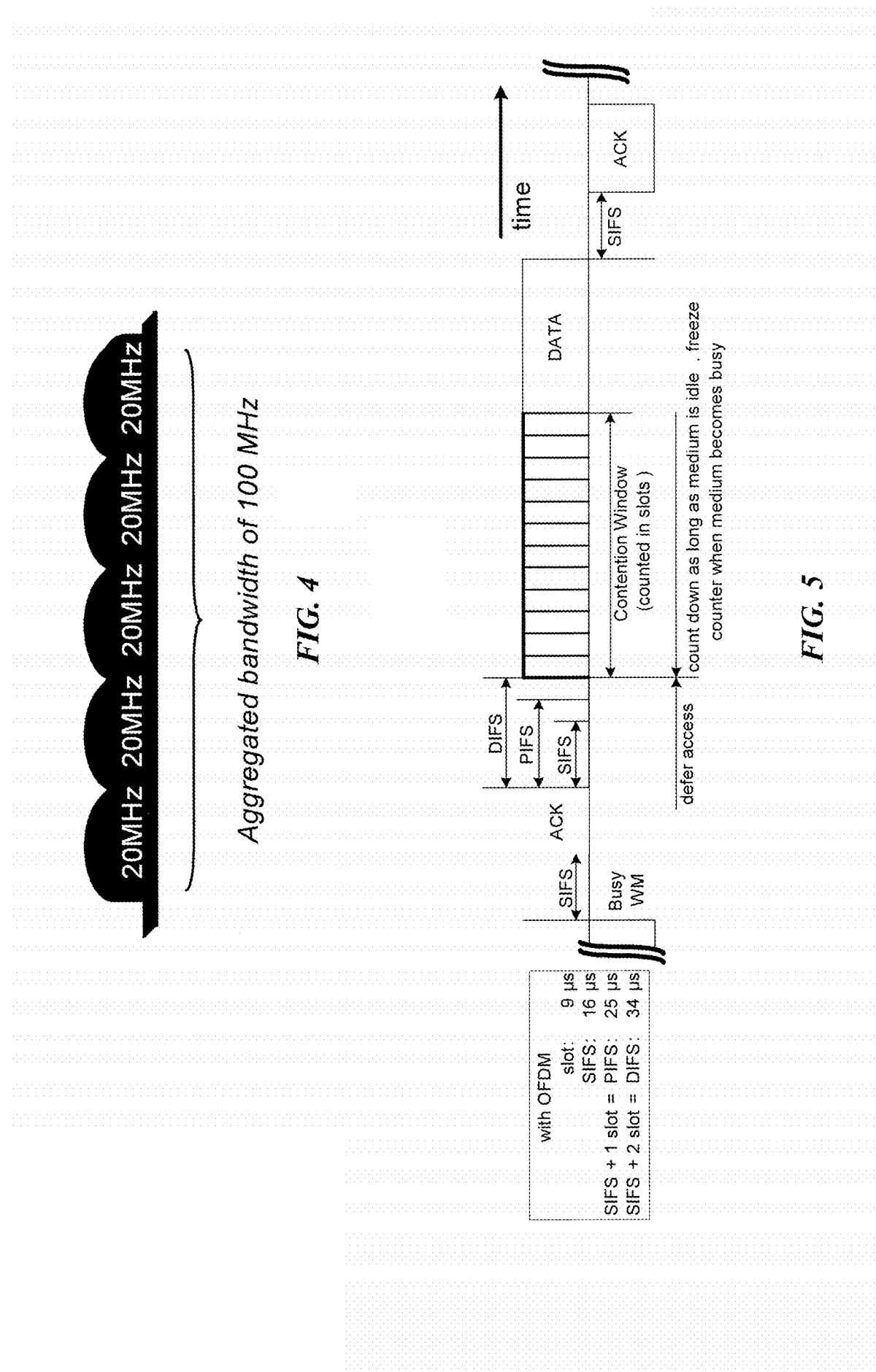
FIG. 4 illustrates an example of carrier aggregation.
FIG. 5 illustrates an example WLAN listen-before-talk mechanism.
Figures 6, 7:
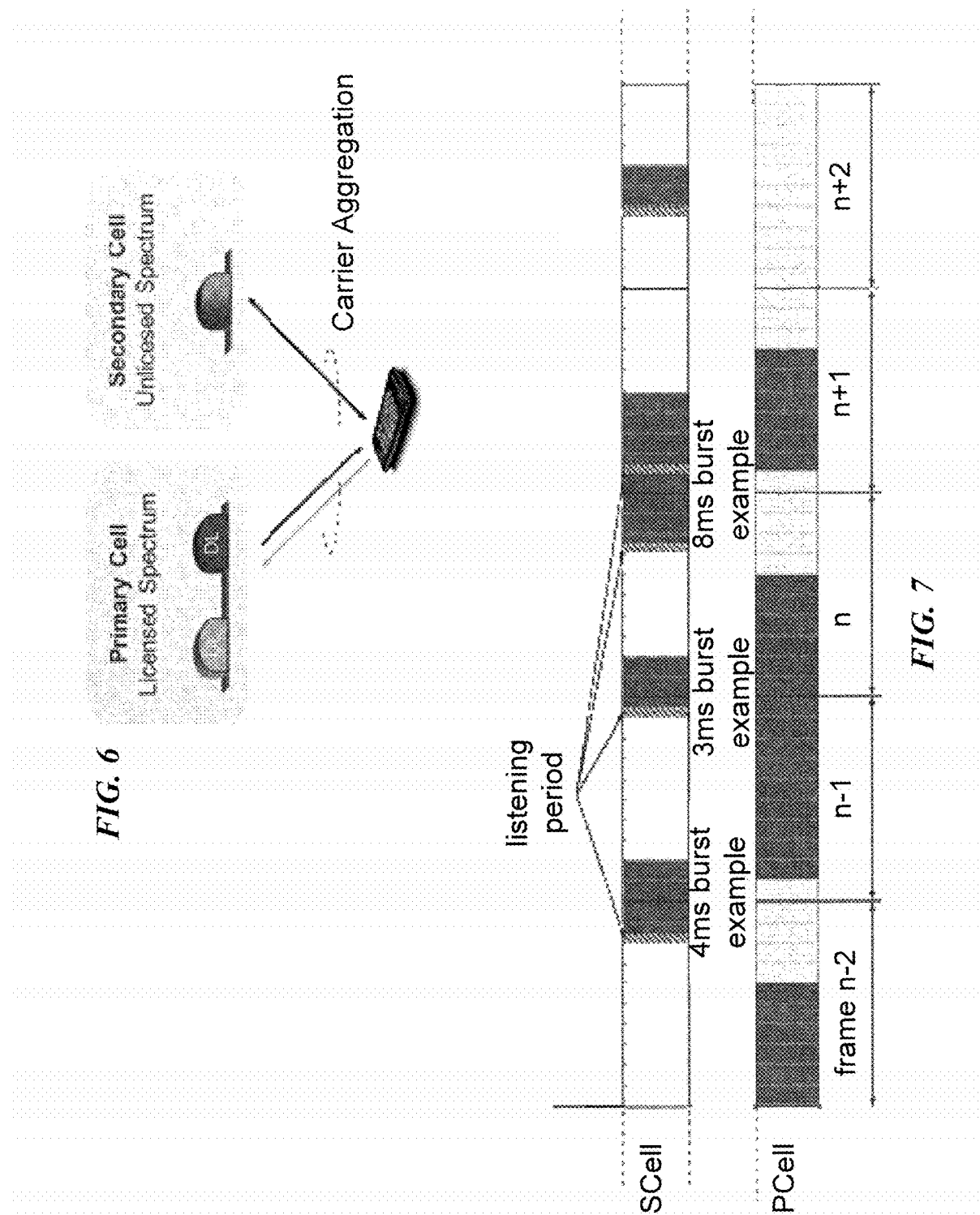
FIG. 6 illustrates a user equipment with license assisted access to unlicensed spectrum.
FIG. 7 illustrates an example of license assisted access to unlicensed spectrum using LTE carrier aggregation and listen-before-talk.
Figures 8, 9:
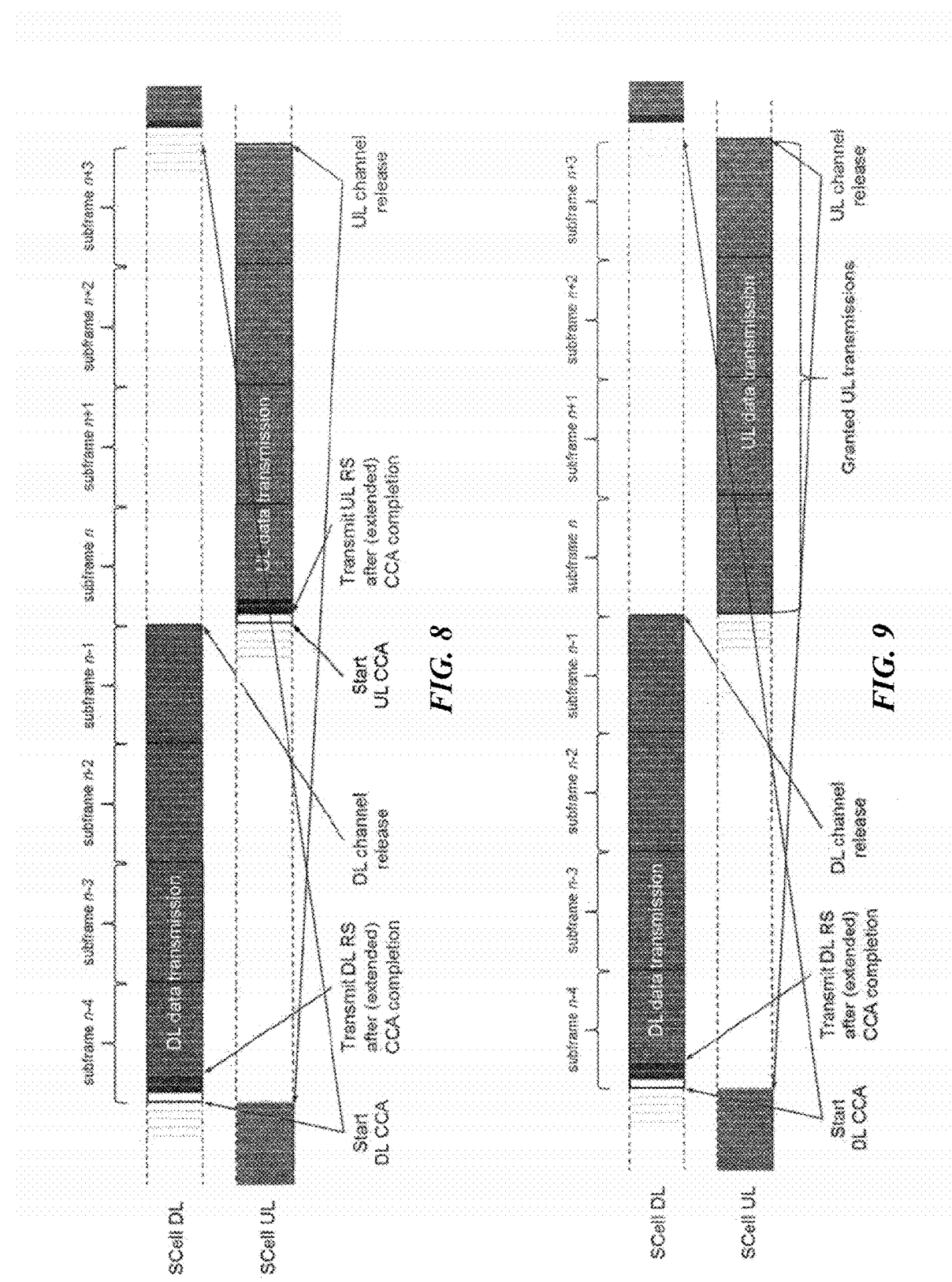
FIG. 8 illustrates an example of uplink license assisted access transmissions based on an uplink listen-before-talk protocol.
FIG. 9 illustrates an example of uplink license assisted access transmissions based on a reverse direction grant protocol.

Wireless signals 130 may include frames and subframes, such as those described with respect to FIGS. 1-3. Network node 120 may dynamically schedule subframes as an uplink subframe, a downlink subframe, or a combination uplink and downlink subframe.

Network node 120 may operate in a licensed frequency spectrum, such as an LTE spectrum. Network node 120 may also operate in an unlicensed frequency spectrum, such as a 5 GHz Wi-Fi spectrum. In an unlicensed frequency spectrum, network node 120 may coexist with other devices such as IEEE 802.11 access points and terminals. To share the unlicensed spectrum, network node 120 may perform LBT protocols before transmitting or receiving wireless signals 130. Wireless device 110 may also operate in one or both of licensed or unlicensed spectrum and in some embodiments may also perform LBT protocols before transmitting wireless signals 130. Both network node 120 and wireless device 110 may also operate in licensed shared spectrum.

For example, network node 120a may operate in a licensed spectrum and network node 120b may operate in an unlicensed spectrum. Wireless device 110 may operate in both licensed and unlicensed spectrum. In particular embodiments, network nodes 120a and 120b may be configurable to operate in a licensed spectrum, an unlicensed spectrum, a licensed shared spectrum, or any combination. Although the coverage area of cell 115b is illustrated as included in the coverage area of cell 115a, in particular embodiments the coverage areas of cells 115a and 115b may overlap partially, or may not overlap at all.

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

In particular embodiments, wireless device 110 and network nodes 120 may perform carrier aggregation. For example, network node 120a may serve wireless device 110 as a PCell and network node 120b may serve wireless device 110 as a SCell. Network nodes 120 may perform self-scheduling or cross-scheduling. If network node 120a is operating in licensed spectrum and network node 120b is operating in unlicensed spectrum, network node 120a may provide license assisted access to the unlicensed spectrum (i.e., network node 120a is a LAA PCell and network node 120b is a LAA SCell).

In particular embodiments, network node 120a may dynamically schedule uplink and downlink subframes for wireless device 110. For example, in particular embodiments network node 120a may determine a first uplink/downlink scheduling pattern for a first plurality of consecutive subframes. Network node 120a may transmit the first uplink/downlink scheduling pattern to wireless device 110 (e.g., using (E)PDCCH) and transmit at least one subframe to wireless device 110 according to the first uplink/downlink scheduling pattern.

If network node 120a received additional downlink data, or a request for uplink transmission from a wireless device, for example, then network node 120a may determine a second uplink/downlink scheduling pattern for a second plurality of consecutive subframes. Network node 120a may transmit the second uplink/downlink scheduling pattern to wireless device 110 in any of the subframes previously scheduled for wireless device 110.

In particular embodiments, the uplink/downlink scheduling pattern may comprise a number of subsequent downlink subframes, a number of subsequent downlink and uplink subframes, an indication of which subframes to monitor or not monitor for downlink, or any other suitable pattern. Other embodiments with respect to network nodes are described in more detail below.

In particular embodiments, wireless device 110 may receive, from network node 120 (e.g., using (E)PDCCH), a first uplink/downlink scheduling pattern for a first plurality of consecutive subframes. Wireless device 110 may receive at least one subframe according to the first uplink/downlink scheduling pattern. In one of the scheduled downlink subframes, wireless device 110 may receive a second uplink/downlink scheduling pattern for a second plurality of consecutive subframes. Other embodiments with respect to wireless devices are described in more detail below.

Although particular embodiments are described with respect to licensed or unlicensed spectrum, license assisted access, and/or carrier aggregation, the embodiments described herein apply equally to dynamic uplink and downlink scheduling in any spectrum and with respect to a single cell or any combination of cells.

In wireless network 100, each radio network node 120 may use any suitable radio access technology, such as long term evolution (LTE), LTE-Advanced, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 13A below. Similarly, a network node may include any suitable combination of hardware and/or software. For example, in particular embodiments, a network node, such as network node 120, may include the components described with respect to FIG. 14A below.

The following embodiments describe a network node that transmits information about subsequent downlink and uplink subframes to a served wireless device to enable scheduling flexibility and to provide accurate updates of such information. Following the general descriptions are descriptions of example methods in a network node and example methods in a wireless device.

In some embodiments, a network node transmits subsequent downlink and uplink subframe information in a PDCCH or an EPDCCH. The information may include two numerical values representing the number of downlink subframes and the number of uplink subframes that will follow after the current subframe. In other embodiments, the information may only include downlink information, such as an explicit number of downlink subframes that will follow.

For example, in a first subframe n, an eNB may determine to transmit 2 downlink and 0 uplink subframes in subsequence based on its current buffer status. The eNB may broadcast that it intends to transmit in the downlink in subframes n+1 and n+2. In other words, the eNB may determine and transmit a first uplink/downlink scheduling pattern (i.e., 2 DL, 0 UL) for a first plurality of consecutive subframes (i.e., subframes n+1 and n+2).

If additional downlink data arrives at the eNB, for example, the eNB may determine to transmit 5 downlink and 0 uplink subframes in subframe n+1. The eNB may broadcast that it intends to transmit in the downlink in subframes n+2, n+3, n+4, n+5 and n+6. In other words, the eNB may determine and transmit a second uplink/downlink scheduling pattern (i.e., 5 DL, 0 UL) for a second plurality of consecutive subframes (i.e., subframes n+2, n+3, n+4, n+5 and n+6). The second plurality of consecutive subframes shares at least one subframe with the first plurality of consecutive subframes (i.e., subframe n+2).

The eNB may continue do dynamically update the scheduling of subframes as determined by traffic patterns. For example, if several UEs request uplink transmission permission, the eNB may determine to transmit 4 downlink and 3 uplink subframes in subframe n+2. The eNB may broadcast that it intends to transmit in the downlink in subframe n+3, n+4, n+5 and n+6 after which UEs are scheduled to transmit in the uplink in subframes n+7, n+8 and n+9.

In particular embodiments, a network node may transmit the scheduling information on a PCell, a SCell, or a LAA SCell, for example. One (E)PDCCH may also carry the subsequent downlink and uplink subframe information for the PCell, or for one or more SCells (e.g., for one or more LAA SCells for operation on an unlicensed spectrum). The scheduling information may be self-scheduled or cross-scheduled.

In some embodiments, a network node may use broadcast or dedicated signaling to inform a wireless device whether the wireless device should monitor particular downlink subframes. More generally, a network node may provide a wireless device with a variety of information that may result in the same dynamic scheduling described above. For example, in particular embodiments a network node may provide a set (or window) of coming uplink subframes. A network node may provide a set (or window) of coming downlink subframes. In particular embodiments, a network node may provide a set (or window) of subframes for which the wireless device does not need to monitor in downlink. A network node may provide a set (or window) of subframes for which the wireless device does need to monitor in downlink. In the embodiments that specify a set or window of subframes, the set or window of subframes may start from the point the wireless device receives the information or be offset in time by a given constant (e.g., number of subframes, number of ms, etc.). As described above, the scheduling information may be sent on a PCell, SCell, LAA SCell, self-scheduled, cross-scheduled, etc.

In some embodiments, for wireless devices in active time (i.e., not in DRX), the wireless device may conserve power by determining when not to monitor the subframes for downlink. For example, a wireless device may be informed that a network node has scheduled other wireless devices in uplink for a given point of time, or that the network node does not intend to transmit for a given time in downlink.

In particular embodiments, a network node may inform the wireless device using PDCCH. For example, the network node may transmit a DCI message on the PDCCH within the common search space to inform wireless devices when the network node will shift to uplink, or not transmit anything more on a given cell (e.g., an LAA SCell). The network node may transmit the information with a specific RNTI. The RNTI may, for example, be LAA-RNTI in case of an LAA SCell. If a wireless device does not receive the DCI message, the wireless device may assume it should monitor the applicable subframes for downlink as long as the wireless device is not scheduled for uplink, in which case it will transmit in uplink. In particular embodiments, the PCell and other cell identities for a wireless device may be wireless device specific. Thus, particular embodiments may define a common form of information to identify cells across wireless devices. Particular embodiments may extend the same solution to EPDCCH by defining a common search space on EPDCCH so that multiple wireless devices may share the same search space.

Other embodiments may transmit a control channel on each cell, for example on each LAA SCell, that can be received by all wireless devices that includes the scheduling information described above. For example, such signaling might reuse PCFICH. Instead of indicating the ending position of PDCCH and the starting position of PDSCH, the PCFICH may indicate whether the wireless device should monitor the next subframes in downlink. PCFICH is able to indicate four values. In particular embodiments, one value may indicate that the next subframe should be monitored in downlink, and the other three values may indicate ranges of subframes that should not be monitored in downlink.

Particular embodiments may include wireless device with a detector to determine whether the signal is present. If the signal is not detected, the next subframe may be monitored in downlink by the wireless device if the wireless device does not go in DRX.

In some embodiments, a network node may use signaling specific to a wireless device the enables the wireless device to conserve power by not monitoring subframes for downlink transmission. The signaling may be similar to the broadcast mechanism targeting wireless devices that are in active time (i.e., not in DRX).

In particular embodiments, the network node may use dedicated signaling to signal a wireless device that the wireless device may conserve power by not monitoring for downlink transmissions during uplink subframes. For example, if a wireless device knows that particular subframes will be uplink subframes, the wireless devices that are not assigned with an uplink grant for those subframes can stop monitoring subframes in downlink. As another example, the wireless device may be informed that it can stop monitoring subframes in downlink for a particular number of subframes within a window of upcoming subframes. The window length may depend on the scheduler and LBT and TXOP.

In particular embodiments, the network node may use dedicated signaling to signal a wireless device that the wireless device may conserve power by not monitoring for downlink transmissions during downlink subframes. For example, the wireless device may be informed that it may save power by not monitoring for downlink transmission for a certain number of subframes within a window of upcoming subframes. The window length may depend on the scheduler and LBT and TXOP.

For signaling specific to a wireless device, particular embodiments may use either PDCCH or EPDCCH. For example, particular embodiments may include new bits to indicate to a wireless device whether it should not monitor the downlink subframe(s) within a window of upcoming subframes. The window may start immediately, or with an offset from a DCI message. For an uplink grant, an offset may apply. If the switching point between downlink and uplink is in the subframe directly following the uplink grant, however, then no offset may be needed. For a downlink assignment, an offset may not be needed. Similar to uplink, if an uplink is scheduled for other wireless devices the downlink assignment may be used as an offset to indicate the starting point of the window.

In particular embodiments, a message dedicated to a particular wireless device may be sent on either the cell it applies for on another cell. If it is sent on another cell, then a cell indicator may be included in the message. For cross-carrier scheduling, the DCI message may be sent on another cell, but the indication may be assumed to apply to the cell that it is targeting.

Figure 11:
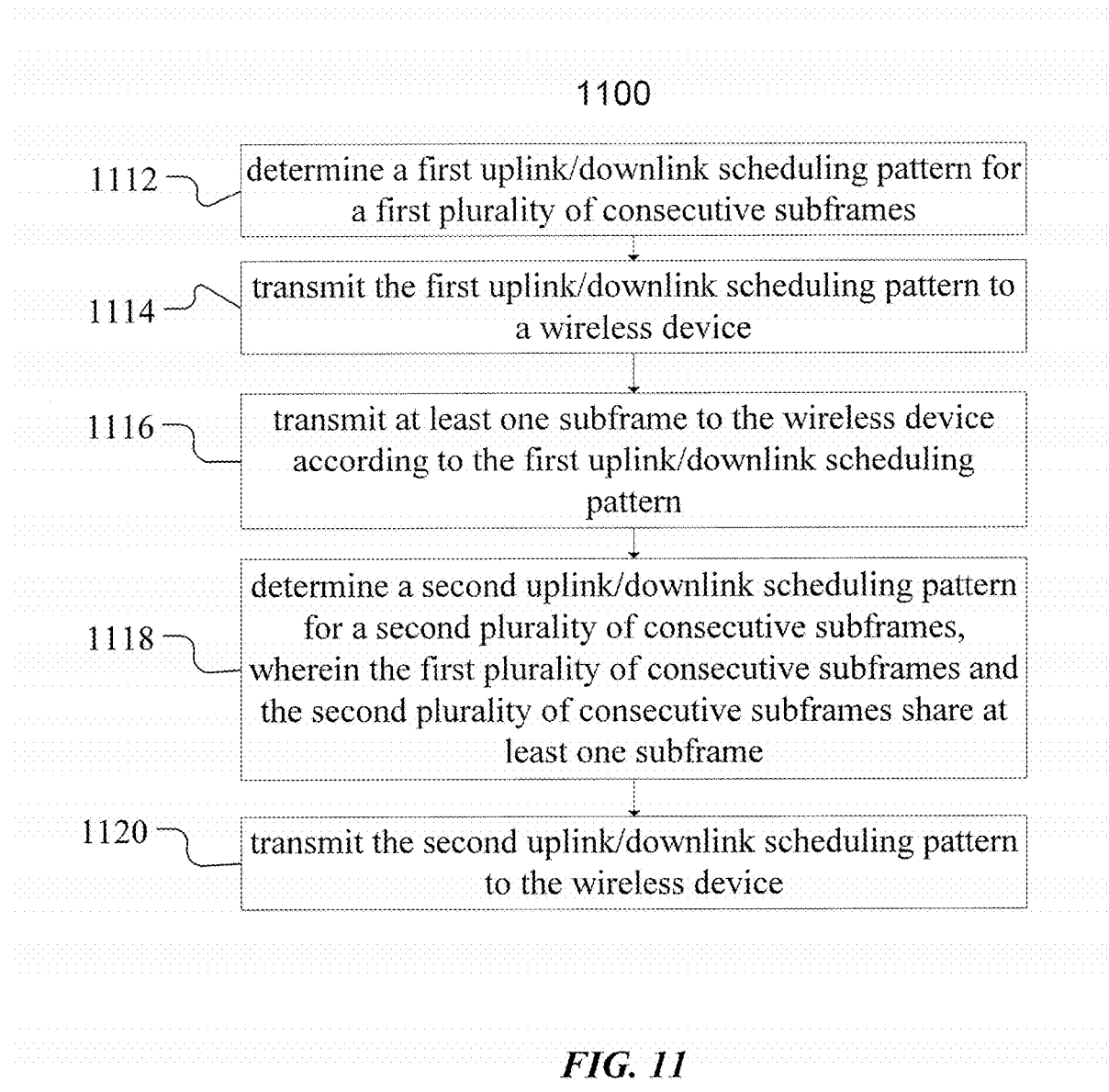
FIG. 11 is a flow diagram illustrating an example method in a network node of scheduling an uplink/downlink pattern for subframes, according to some embodiments.

FIG. 11 is a flow diagram illustrating an example method in a network node of scheduling an uplink/downlink pattern for subframes, according to some embodiments. In particular embodiments, one or more steps of FIG. 11 may be performed by network node 120 of wireless network 100 described with respect to FIG. 10.

At step 1112, the network node determines a first uplink/downlink scheduling pattern for a first plurality of consecutive subframes. For example, network node 120a may determine, based on its current buffer status, that the first uplink/downlink scheduling pattern comprises transmitting 2 downlink subframes followed by 0 uplink subframes.

In particular embodiments, the first uplink/downlink scheduling pattern may comprise any of the uplink/downlink scheduling patterns described above. For example, the patterns may include a number of downlink of uplink subframes, a set or window of frames to monitor or not to monitor for uplink or downlink, or any suitable combination of patterns.

At step 1114, the network node transmits the first uplink/downlink scheduling pattern to a wireless device. For example, network node 120a may transmit to wireless device 110 a pattern indicating that subframes n+1 and n+2 are downlink subframes. In particular embodiments, the network node may use any of the broadcast or dedicated signaling methods described above to transmit the uplink/downlink scheduling pattern. Some embodiments may use any one or more of a PDCCH, EPDCCH, or PCFICH.

At step 1116, the network node transmits at least one subframe to the wireless device according to the first uplink/downlink scheduling pattern. For example, network node 120a may transmit downlink subframe n+1 to wireless device 110. In particular embodiments, such as embodiments using cross-scheduling, a different network node may transmit the subframes to the wireless device according to the scheduling pattern.

At step 1118, the network node determine a second uplink/downlink scheduling pattern for a second plurality of consecutive subframes, wherein the first plurality of consecutive subframes and the second plurality of consecutive subframes share at least one subframe. For example, network node 120a may determine, based on additional downlink data, to transmit 5 downlink and 0 uplink subframes in subframe n+1. In this example, the second plurality of consecutive subframes (i.e., subframes n+2, n+3, n+4, n+5 and n+6) shares at least one subframe with the first plurality of consecutive subframes (i.e., subframe n+2).

At step 1120, the network node transmits the second uplink/downlink scheduling pattern to the wireless device. For example, network node 120a may transmit to wireless device 110 a pattern indicating that subframes n+2, n+3, n+4, n+5 and n+6 are downlink subframes. In particular embodiments, the network node may use any of the broadcast or dedicated signaling methods described above to transmit the uplink/downlink scheduling pattern.

Modifications, additions, or omissions may be made to method 1100. Additionally, one or more steps in method 1100 of FIG. 11 may be performed in parallel or in any suitable order. All or parts of method 1100 may be repeated over time as necessary.

Figure 12:
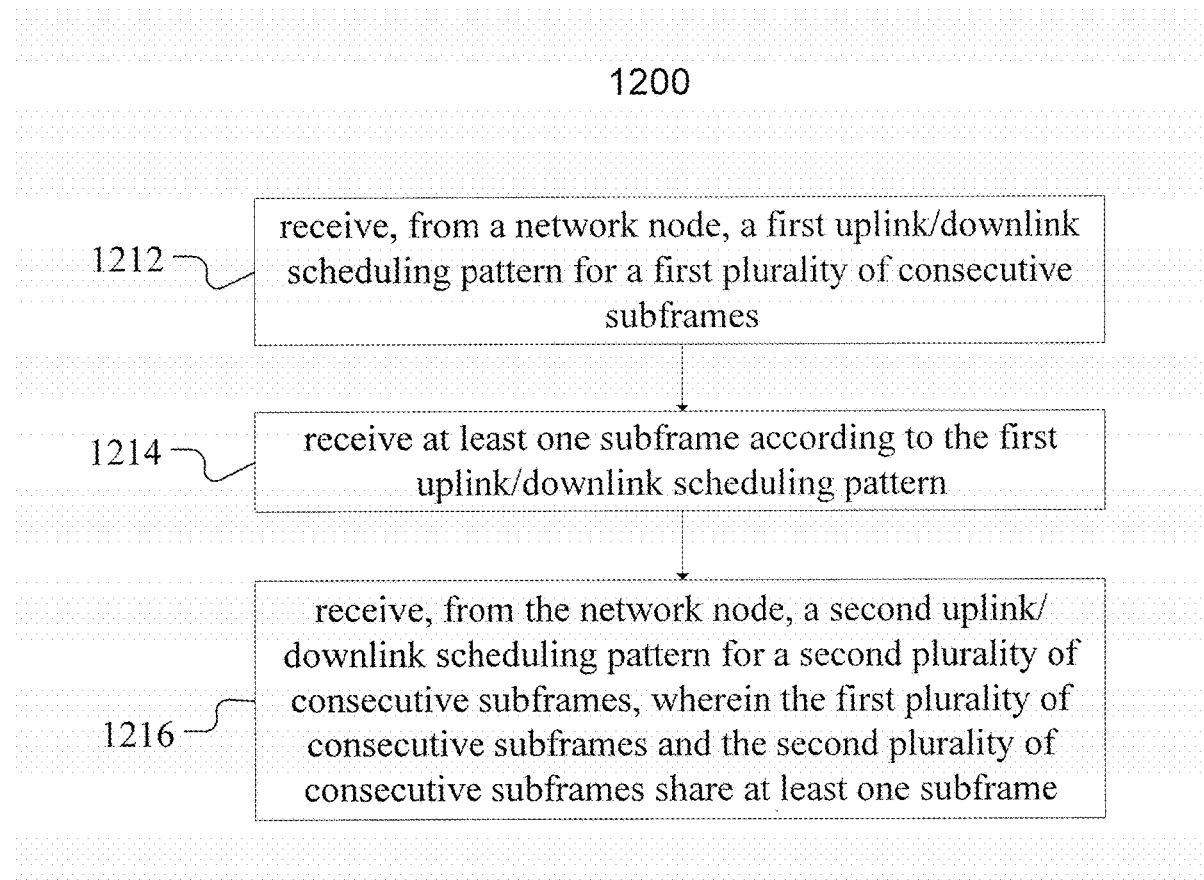
FIG. 12 is a flow diagram illustrating an example method in a wireless device of receiving an uplink/downlink pattern for subframes, according to some embodiments.

FIG. 12 is a flow diagram illustrating an example method in a wireless device of receiving an uplink/downlink pattern for subframes, according to some embodiments. In particular embodiments, one or more steps of FIG. 11 may be performed by network node 120 of wireless network 100 described with respect to FIG. 10.

At step 1212, the wireless device receives, from a network node, a first uplink/downlink scheduling pattern for a first plurality of consecutive subframes. For example, wireless device 110 may receive, from network node 120a, a first uplink/downlink scheduling pattern indicating that subframes n+1 and n+2 are downlink subframes. In particular embodiments, the wireless device receive the uplink/downlink scheduling pattern according to any of the broadcast or dedicated signaling methods described above. Some embodiments may use any one or more of a PDCCH, EPDCCH, or PCFICH. The uplink/downlink scheduling pattern may comprise any of the patterns described above.

At step 1214, the wireless device receives at least one subframe according to the first uplink/downlink scheduling pattern. For example, wireless device 110 may receive downlink subframe n+2.

At step 1216, the wireless device receives, from the network node, a second uplink/downlink scheduling pattern for a second plurality of consecutive subframes, wherein the first plurality of consecutive subframes and the second plurality of consecutive subframes share at least one subframe. For example, wireless device 110 may receive, from network node 120a, a second uplink/downlink scheduling pattern indicating that subframes n+2, n+3, n+4, n+5 and n+6 are downlink subframes. In this example, the second plurality of consecutive subframes (i.e., subframes n+2, n+3, n+4, n+5 and n+6) shares at least one subframe with the first plurality of consecutive subframes (i.e., subframe n+2).

Modifications, additions, or omissions may be made to method 1200. Additionally, one or more steps in method 1200 of FIG. 12 may be performed in parallel or in any suitable order. All or parts of method 1200 may be repeated over time as necessary.

Figure 13A:
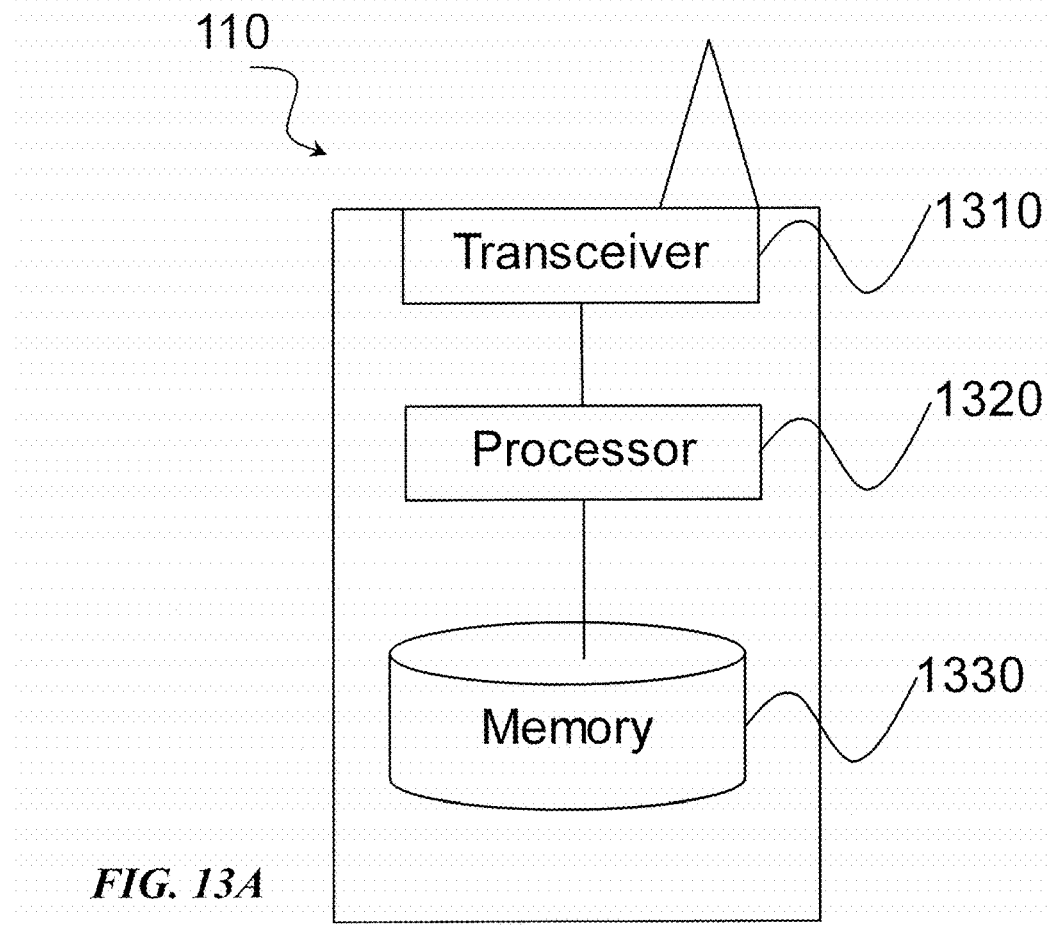
FIG. 13A is a block diagram illustrating an example embodiment of a wireless device.

FIG. 13A is a block diagram illustrating an example embodiment of a wireless device. The wireless device is an example of wireless device 110 illustrated in FIG. 10. The wireless device is operable to receive a first uplink/downlink scheduling pattern for a first plurality of consecutive subframes. The wireless device is further operable to receive at least one subframe according to the first uplink/downlink scheduling pattern. The wireless device is also operable to receive a second uplink/downlink scheduling pattern for a second plurality of consecutive subframes, wherein the first plurality of consecutive subframes and the second plurality of consecutive subframes share at least one subframe.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1310, processor 1320, and memory 1330. In some embodiments, transceiver 1310 facilitates transmitting wireless signals to and receiving wireless signals from wireless network node 120 (e.g., via an antenna), processor 1320 executes instructions to provide some or all of the functionality described herein as provided by the wireless device, and memory 1330 stores the instructions executed by processor 1320.

Processor 1320 includes any suitable combination of hardware and software implemented in one or more integrated circuits or modules to execute instructions and manipulate data to perform some or all of the described functions of the wireless device. In some embodiments, processor 1320 may include, for example, one or more computers, one more programmable logic devices, one or more central processing units (CPUs), one or more microprocessors, one or more applications, and/or other logic, and/or any suitable combination of the preceding. Processor 1320 may include analog and/or digital circuitry configured to perform some or all of the described functions of wireless device 110. For example, processor 1320 may include resistors, capacitors, inductors, transistors, diodes, and/or any other suitable circuit components.

Memory 1330 is generally operable to store computer executable code and data. Examples of memory 1330 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 1320 in communication with transceiver 1310 receives a first uplink/downlink scheduling pattern for a first plurality of consecutive subframes; receives at least one subframe according to the first uplink/downlink scheduling pattern; and receives a second uplink/downlink scheduling pattern for a second plurality of consecutive subframes.

Other embodiments of the wireless device may include additional components (beyond those shown in FIG. 13A) responsible for providing certain aspects of the wireless device's functionality, including any of the functionality described above and/or any additional functionality (including any functionality necessary to support the solution described above).

Figure 13B:
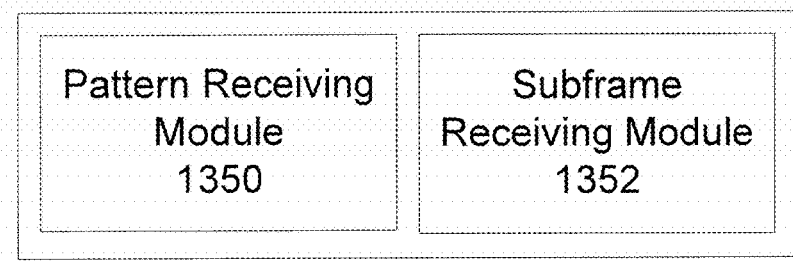
FIG. 13B is a block diagram illustrating example components of a wireless device.

FIG. 13B is a block diagram illustrating example components of a wireless device 110. The components may include pattern receiving module 1350 and subframe receiving module 1352.

Pattern receiving module 1350 may perform the pattern receiving functions of wireless device 110. For example, pattern receiving module 1350 may receive a first and second uplink/downlink scheduling pattern for a first and second plurality of consecutive subframes. In certain embodiments, pattern receiving module 1350 may include or be included in processor 1320. Pattern receiving module 1350 may include circuitry configured to receive radio signals. In particular embodiments, pattern receiving module 1350 may communicate with subframe receiving module 1352.

Subframe receiving module 1352 may perform the subframe receiving functions of wireless device 110. For example, subframe receiving module 1352 may receive a subframe according to the first or second uplink/downlink scheduling pattern. In certain embodiments, subframe receiving module 1352 may include or be included in processor 1320. Subframe receiving module 1352 may include circuitry configured to receive radio signals. In particular embodiments, subframe receiving module 1352 may communicate with pattern receiving module 1350.

Figure 14A:
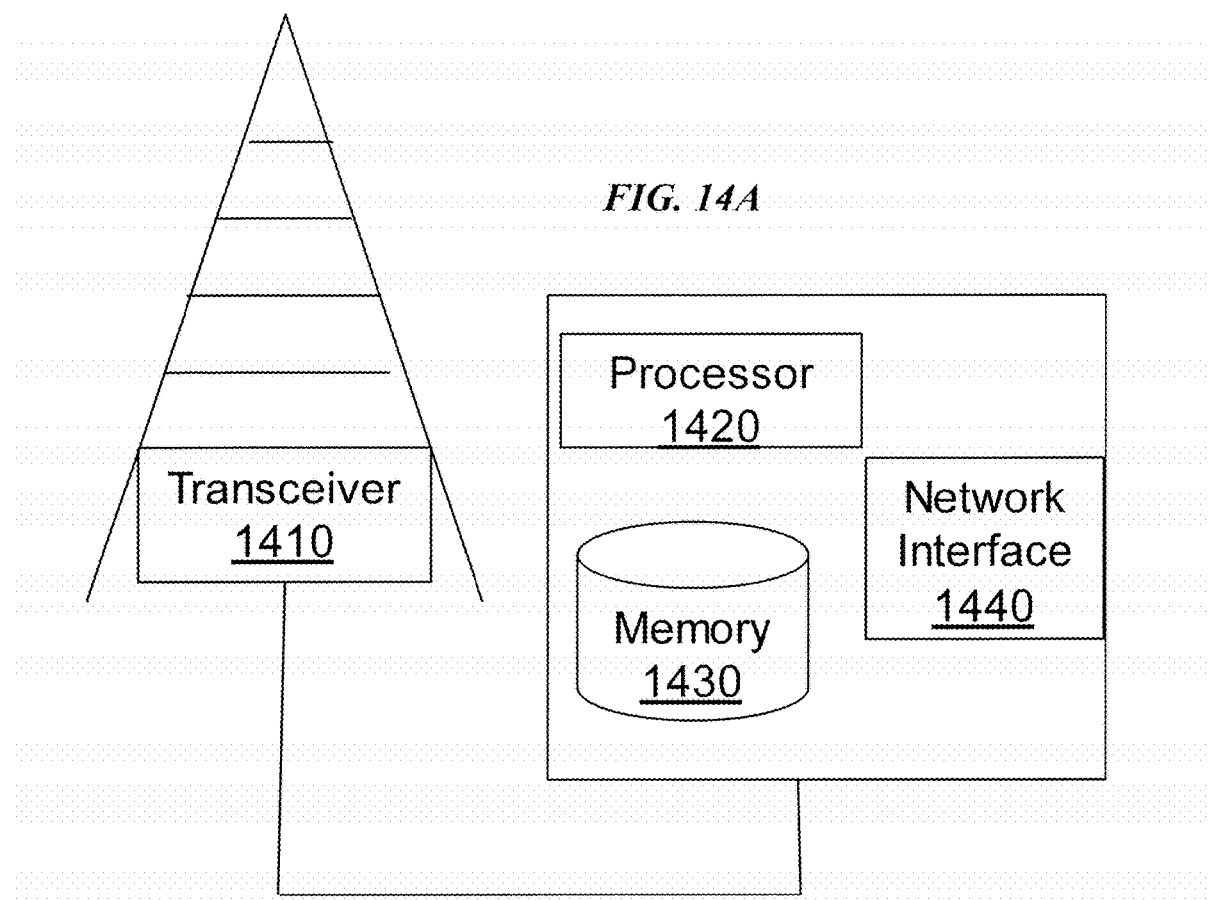
FIG. 14A is a block diagram illustrating an example embodiment of a network node.

FIG. 14A is a block diagram illustrating an example embodiment of a network node. The network node is an example of the network node 120 illustrated in FIG. 10. The network node is operable to determine a first uplink/downlink scheduling pattern for a first plurality of consecutive subframes and transmit the first uplink/downlink scheduling pattern to a wireless device. The network node is further operable to transmit at least one subframe to the wireless device according to the first uplink/downlink scheduling pattern. The network node is also operable to determine a second uplink/downlink scheduling pattern for a second plurality of consecutive subframes, wherein the first plurality of consecutive subframes and the second plurality of consecutive subframes share at least one subframe, and transmit the second uplink/downlink scheduling pattern to the wireless device.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 1410, at least one processor 1420, at least one memory 1430, and at least one network interface 1440. Transceiver 1410 facilitates transmitting wireless signals to and receiving wireless signals from a wireless device, such as wireless devices 110 (e.g., via an antenna); processor 1420 executes instructions to provide some or all of the functionality described above as being provided by a network node 120; memory 1430 stores the instructions executed by processor 1420; and network interface 1440 communicates signals to backend network components, such as a gateway, switch, router, Internet, Public Switched Telephone Network (PSTN), controller, and/or other network nodes 120. Processor 1420 and memory 1430 can be of the same types as described with respect to processor 1320 and memory 1330 of FIG. 13A above.

In some embodiments, network interface 1440 is communicatively coupled to processor 1420 and refers to any suitable device operable to receive input for network node 120, send output from network node 120, perform suitable processing of the input or output or both, communicate to other devices, or any combination of the preceding. Network interface 1440 includes appropriate hardware (e.g., port, modem, network interface card, etc.) and software, including protocol conversion and data processing capabilities, to communicate through a network.

In particular embodiments, processor 1420 in communication with transceiver 1410 determines a first uplink/downlink scheduling pattern for a first plurality of consecutive subframes; transmits the first uplink/downlink scheduling pattern to a wireless device; transmits at least one subframe to the wireless device according to the first uplink/downlink scheduling pattern; determines a second uplink/downlink scheduling pattern for a second plurality of consecutive subframes; and transmits the second uplink/downlink scheduling pattern to the wireless device.

Other embodiments of network node 120 include additional components (beyond those shown in FIG. 14A) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 14B:
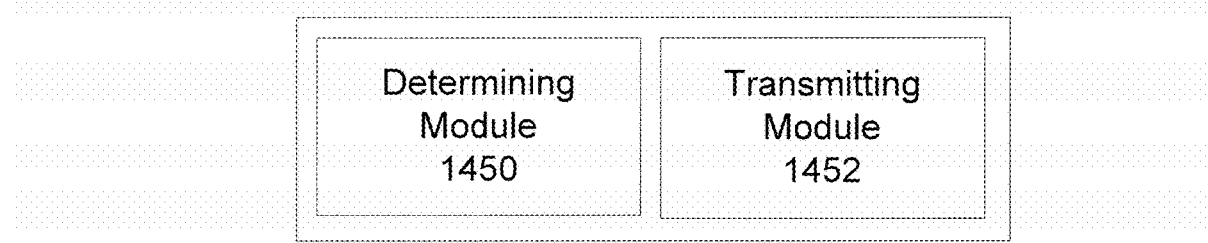
FIG. 14B is a block diagram illustrating example components of a network node.

FIG. 14B is a block diagram illustrating example components of a network node 120. The components may include determining module 1450 and transmitting module 1452.

Determining module 1450 may perform the determining functions of network node 120. For example, determining module 1450 may determine a first and second uplink/downlink scheduling pattern for a first and second plurality of consecutive subframes. In certain embodiments, synchronization determining module 1150 may include or be included in processor 1420. In particular embodiments, determining module 1450 may communicate with transmitting module 1452.

Transmitting module 1452 may perform the transmitting functions of network node 120. For example, transmitting module 1452 may transmit uplink/downlink scheduling patterns and downlink subframes to wireless device 110. In certain embodiments, transmitting module 1452 may include or be included in processor 1420. Transmitting module 1452 may include circuitry configured to transmit radio signals. In particular embodiments, transmitting module 1452 may communicate with determining module 1450.

Some embodiments of the disclosure may provide one or more technical advantages. As an example, some embodiments provide scheduling flexibility, which improves network efficiency (e.g., efficient bandwidth usage) and provides adaptability to interference and/or traffic demands. Problems associated with fixing a scheduling pattern at the beginning of a long transmission burst may be avoided. Particular embodiments conserve power and battery life by not requiring all wireless devices to wake up from discontinuous reception mode and search for the specific point where scheduling information is received. Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BTS Base Transceiver Station
CCA Clear Channel Assessment
CFP Contention-Free Period
D2D Device to Device
DCF Distributed Coordination Function
DIFS DCF Inter-frame Spacing
DL Downlink
DRS Discovery Reference Signal
eNB eNodeB
EPDCCH Enhanced Physical Downlink Control Channel
FDD Frequency Division Duplex
LAA Licensed Assisted Access
LBT Listen Before Talk
LTE Long Term Evolution
M2M Machine to Machine MIMO Multi-Input Multi-Output
MTC Machine Type Communication
OFDM Orthogonal Frequency Division Multiplexing
PCell Primary Cell
PCF Point Coordination Function
PDCCH Physical Downlink Control Channel
PDSCH Physical Downlink Shared Channel
PIFS PCF Inter-frame Spacing
PUCCH Physical Uplink Control Channel
PUSCH Physical Uplink Shared Channel
RAN Radio Access Network
RAT Radio Access Technology
RRH Remote Radio Head
RRU Remote Radio Unit
SCell Secondary Cell
SeNB Secondary eNodeB
SIFS Short Inter-frame Spacing
TDD Time division duplex
UE User Equipment
WAN Wireless Access Network

The invention claimed is:

1. A method in a network node, the method comprising:
determining a first uplink/downlink scheduling pattern for a first plurality of consecutive subframes based on a traffic pattern of data to transmit or receive;
transmitting the first uplink/downlink scheduling pattern to a wireless device;
transmitting or receiving at least one subframe of the first plurality of consecutive subframes to or from the wireless device according to the first uplink/downlink scheduling pattern;
determining the traffic pattern of data to transmit or receive has changed;
determining, based on the changed traffic pattern, a second uplink/downlink scheduling pattern for a second plurality of consecutive subframes, wherein the first plurality of consecutive subframes and the second plurality of consecutive subframes overlap in time by at least one shared subframe;
transmitting the second uplink/downlink scheduling pattern to the wireless device; and
transmitting or receiving the at least one shared subframe according to the second uplink/downlink scheduling pattern,
wherein the first uplink/downlink scheduling pattern comprises at least one of:
a set of subframes in the first plurality of subframes that the wireless device does not monitor for downlink; and
a set of subframes in the first plurality of subframes that the wireless device does monitor for downlink.

2. The method of claim 1, wherein the first uplink/downlink scheduling pattern comprises:
a first value representing a number of downlink subframes in the first plurality of consecutive subframes; and
a second value representing a number of uplink subframes in the first plurality of consecutive subframes.

3. The method of claim 1, wherein transmitting the first uplink/downlink scheduling pattern to the wireless device comprises transmitting the first uplink/downlink scheduling pattern in a long term evolution (LTE) physical downlink control channel (PDCCH) or enhanced physical downlink control channel (EPDCCH).

4. The method of claim 1, wherein transmitting the first uplink/downlink scheduling pattern to the wireless device comprises transmitting the first uplink/downlink scheduling pattern in a LTE physical control format indicator channel (PCFICH).

5. The method of claim 1, wherein the network node serves a first cell and the first uplink/downlink scheduling pattern applies to a second cell different from the first cell.

6. A method in a wireless device, the method comprising:
receiving, from a network node, a first uplink/downlink scheduling pattern for a first plurality of consecutive subframes;
receiving or transmitting at least one subframe according to the first uplink/downlink scheduling pattern;
receiving, from the network node, a second uplink/downlink scheduling pattern for a second plurality of consecutive subframes, wherein the first plurality of consecutive subframes and the second plurality of consecutive subframes overlap in time by at least one shared subframe; and
transmitting or receiving the at least one shared subframe according to the second uplink/downlink scheduling pattern,
wherein the first uplink/downlink scheduling pattern comprises at least one of:
a set of subframes in the first plurality of subframes that the wireless device does not monitor for downlink; and
a set of subframes in the first plurality of subframes that the wireless device does monitor for downlink.

7. The method of claim 6, wherein the first uplink/downlink scheduling pattern comprises:
a first value representing a number of downlink subframes in the first plurality of consecutive subframes; and
a second value representing a number of uplink subframes in the first plurality of consecutive subframes.

8. The method of claim 6, wherein receiving the first uplink/downlink scheduling pattern from the network node comprises receiving the first uplink/downlink scheduling pattern in a long term evolution (LTE) physical downlink control channel (PDCCH) or enhanced physical downlink control channel (EPDCCH).

9. The method of claim 6, wherein receiving the first uplink/downlink scheduling pattern from the network node comprises receiving the first uplink/downlink scheduling pattern in a LTE physical control format indicator channel (PCFICH).

10. The method of claim 6, wherein the network node serves a first cell and the first uplink/downlink scheduling pattern applies to a second cell different from the first cell.

11. A network node comprising a processor and a memory, the processor operable to:
determine a first uplink/downlink scheduling pattern for a first plurality of consecutive subframes based on a traffic pattern of data to transmit or receive;
transmit the first uplink/downlink scheduling pattern to a wireless device;
transmit or receive at least one subframe of the first plurality of consecutive subframes to or from the wireless device according to the first uplink/downlink scheduling pattern;
determine the traffic pattern of data to transmit or receive has changed;
determine, based on the changed traffic pattern, a second uplink/downlink scheduling pattern for a second plurality of consecutive subframes, wherein the first plurality of consecutive subframes and the second plurality of consecutive subframes overlap in time by at least one shared subframe;

transmit the second uplink/downlink scheduling pattern to the wireless device; and transmit or receive the at least one shared subframe according to the second uplink/downlink scheduling pattern, wherein the first uplink/downlink scheduling pattern comprises at least one of:
- a set of subframes in the first plurality of subframes that the wireless device does not monitor for downlink; and
- a set of subframes in the first plurality of subframes that the wireless device does monitor for downlink.

12. The network node of claim 11, wherein the first uplink/downlink scheduling pattern comprises:
- a first value representing a number of downlink subframes in the first plurality of consecutive subframes; and
- a second value representing a number of uplink subframes in the first plurality of consecutive subframes.

13. The network node of claim 11, wherein the processor is operable to transmit the first uplink/downlink scheduling pattern in a long term evolution (LTE) physical downlink control channel (PDCCH) or enhanced physical downlink control channel (EPDCCH).

14. The network node of claim 11, wherein the processor is operable to transmit the first uplink/downlink scheduling pattern in a LTE physical control format indicator channel (PCFICH).

15. The network node of claim 11, wherein the network node serves a first cell and the first uplink/downlink scheduling pattern applies to a second cell different from the first cell.

16. A wireless device comprising a processor and a memory, the processor operable to:
- receive, from a network node, a first uplink/downlink scheduling pattern for a first plurality of consecutive subframes;
- receive or transmit at least one subframe according to the first uplink/downlink scheduling pattern;
- receive, from the network node, a second uplink/downlink scheduling pattern for a second plurality of consecutive subframes, wherein the first plurality of consecutive subframes and the second plurality of consecutive subframes overlap in time by at least one shared subframe; and
- transmit or receive the at least one shared subframe according to the second uplink/downlink scheduling pattern, wherein the first uplink/downlink scheduling pattern comprises at least one of:
- a set of subframes in the first plurality of subframes that the wireless device does not monitor for downlink; and
- a set of subframe in the first plurality of subframes that the wireless device does monitor for downlink.

17. The wireless device of claim 16, wherein the first uplink/downlink scheduling pattern comprises:
- a first value representing a number of downlink subframes in the first plurality of consecutive subframes; and
- a second value representing a number of uplink subframes in the first plurality of consecutive subframes.

18. The wireless device of claim 16, wherein the processor is operable to receive the first uplink/downlink scheduling pattern in a long term evolution (LTE) physical downlink control channel (PDCCH) or enhanced physical downlink control channel (EPDCCH).

19. The wireless device of claim 16, wherein the processor is operable to receive the first uplink/downlink scheduling pattern in a LTE physical control format indicator channel (PCFICH).

20. The wireless device of claim 16, wherein the network node serves a first cell and the first uplink/downlink scheduling pattern applies to a second cell different from the first cell.

* * * * *